US012712768B2

(12) United States Patent
Lee et al.

(10) Patent No.: US 12,712,768 B2
(45) Date of Patent: Aug. 18, 2026

(54) RECEIVERS USING POWER SAVING AND PARTIAL DECISION FEEDBACK EQUALIZATION METHODS

(71) Applicant: Samsung Electronics Co., Ltd., Suwon-si (KR)

(72) Inventors: Jusung Lee, Suwon-si (KR); Younghwan Chang, Suwon-si (KR); Suhwan Kim, Seoul (KR)

(73) Assignees: SAMSUNG ELECTRONICS CO., LTD., Suwon-si (KR); Seoul National University R&DB Foundation, Suwon-si (KR)

(*) Notice: Subject to any disclaimer, the term of this patent is extended or adjusted under 35 U.S.C. 154(b) by 37 days.

(21) Appl. No.: 19/019,581

(22) Filed: Jan. 14, 2025

(65) Prior Publication Data

US 2025/0310157 A1 Oct. 2, 2025

(30) Foreign Application Priority Data

Mar. 28, 2024 (KR) ........................ 10-2024-0042721

(51) Int. Cl.
*H03H 7/30* (2006.01)
*H04L 25/03* (2006.01)
*H04L 25/49* (2006.01)

(52) U.S. Cl.
CPC .. *H04L 25/03057* (2013.01); *H04L 25/03286* (2013.01); *H04L 25/4917* (2013.01)

(58) Field of Classification Search
CPC ......... H04L 25/03057; H04L 25/03286; H04L 25/4917
USPC ......................... 375/233, 219, 220, 295, 316
See application file for complete search history.

(56) References Cited

U.S. PATENT DOCUMENTS

| | | | | |
|---|---|---|---|---|
| 7,620,116 | B2 | 11/2009 | Bessios et al. | |
| 10,491,238 | B2 | 11/2019 | Sudhakaran et al. | |
| 11,394,589 | B1 * | 7/2022 | Mayer | H04L 25/03878 |
| 11,495,271 | B2 | 11/2022 | Woo et al. | |
| 11,500,561 | B1 | 11/2022 | Spirkl et al. | |
| 2022/0209998 | A1 | 6/2022 | Kim et al. | |
| 2022/0262447 | A1 | 8/2022 | Sudhakaran et al. | |
| 2023/0019127 | A1 | 1/2023 | Dong et al. | |
| 2023/0344686 | A1 | 10/2023 | Han et al. | |

* cited by examiner

*Primary Examiner* — Zewdu A Kassa
(74) *Attorney, Agent, or Firm* — Muir Patent Law, PLLC

(57) ABSTRACT

Receivers using power saving and partial decision feedback equalization (DFE) methods are provided. A receiver includes a slicer circuit configured to allow multiple comparator circuits to output multiple decision values, the multiple comparator circuits being connected to a data line and configured to compare a data symbol with multiple reference voltage levels, respectively, in response to multiple clock signals, respectively, a decoder configured to decode the data symbol, based on the multiple decision values, and a control circuit connected to the slicer circuit and configured to store the multiple decision values as a previous data symbol value and, based on the previous data symbol value, selectively provide the multiple clock signals to the slicer circuit. When the previous data symbol value corresponds to the lowest level, the control circuit disables a first comparator circuit to decide the highest level, from among the multiple comparator circuits.

20 Claims, 15 Drawing Sheets

| Symbol bits | | Symbol Levels |
|---|---|---|
| 1 | 1 | +3 |
| 1 | 0 | +1 |
| 0 | 1 | −1 |
| 0 | 0 | −3 |

FIG. 6

| DATA_PRE | | | | | | |
|---|---|---|---|---|---|---|
| DS | DO[2:0] | | | CLK1 | CLK2 | CLK3 |
| | VOH | VOM | VOL | | | |
| +3 | 1 | 1 | 1 | O | O | X |
| +1 | 0 | 1 | 1 | O | O | O |
| −1 | 0 | 0 | 1 | O | O | O |
| −3 | 0 | 0 | 0 | X | O | O |

- Partial DFE Scheme

- DFE According To Related Art

RECEIVERS USING POWER SAVING AND PARTIAL DECISION FEEDBACK EQUALIZATION METHODS

CROSS-REFERENCE TO RELATED APPLICATION

This application is based on and claims priority under 35 U.S.C. § 119 to Korean Patent Application No. 10-2024-0042721, filed on Mar. 28, 2024, in the Korean Intellectual Property Office, the disclosure of which is incorporated by reference herein in its entirety.

BACKGROUND

Aspects of the inventive concepts relate to apparatuses and methods, and more particularly, to receivers using power saving and partial decision feedback equalization (DFE) methods.

Efforts to make computing systems powerful and power-efficient have led to advances in interface communications, increasing throughput while preventing power consumption from increasing, and ideally, reducing power consumption. Some systems implement pulse-amplitude modulation 4-level (PAM4) signaling. PAM4 may be used to convert 2-bit streams into a single multi-level signal (or symbol) having four levels (e.g., [−3], [−1], [+1], and [+3] in FIG. 2). PAM4 signaling may use maximum transition avoidance (MTA) coding to eliminate maximum voltage transition (e.g., [−3]→[+3] or [+3]→[−3]) between multi-level signals on a signal line. If power consumption could be further reduced in PAM4 signaling using MTA coding, it would be beneficial for low-power devices.

PAM4 signaling may allow signal integrity (SI) in high-speed transmission to be identified by using a data eye diagram in which the swings of signals transmitted at multiple levels appear to overlap each other. Eye opening may be designed to be maximized. The size of an eye may decrease as the transition slope between two symbol levels becomes gentle in the data eye diagram (e.g., FIG. 3).

Jitter, crosstalk, inter-symbol interference (ISI) or the like, which causes signal distortion, may occur in PAM4 signaling. ISI may cause a bit in a data signal to interfere with and distort a subsequent bit in the data signal (e.g., smear out and spill over). For example, a bit in a data signal may be received as a distorted signal having residue of a previous bit. ISI may be prominent when a data rate increases, and correspondingly, a pulse width indicating a data bit decreases. The increase of ISI may deteriorate SI.

Apparatuses and methods for reducing power consumption and improving SI characteristics in PAM4 signaling are desired.

SUMMARY

Aspects of the inventive concept provide receivers using power saving and partial decision feedback equalization (DFE) methods.

According to an aspect of the inventive concept, a receiver includes a data line configured to receive a data symbol having multiple voltage levels, the data symbol being modulated according to pulse-amplitude modulation (PAM) and encoded according to maximum transition avoidance (MTA) coding that prevents a maximum transition (MT) event from occurring between symbols, and the multiple voltage levels including a highest level and a lowest level, a comparator circuit connected to the data line and including multiple comparators configured to compare the data symbol with multiple reference voltage levels, respectively, in response to multiple clock signals, respectively, the comparator circuit being configured to output multiple decision values as a result of the comparison, a decoder configured to decode the data symbol, based on the multiple decision values, and a control circuit connected to the comparator circuit and configured to store the multiple decision values as a previous data symbol value and, based on the previous data symbol value, selectively provide the multiple clock signals to the comparator circuit, wherein the control circuit is further configured to, when the previous data symbol value is related to the lowest level, disable a first comparator configured to decide the highest level, from among the multiple comparators.

According to another aspect of the inventive concept, a receiver includes a data line configured to receive a data symbol having multiple voltage levels, the data symbol being modulated according to PAM and encoded according to MTA coding that prevents an MT event from occurring between symbols, a partial decision feedback equalization (DFE) circuit including switches connected to the data line, the partial DFE circuit being configured to selectively equalize the data symbol, based on a previous data symbol value, a slicer circuit connected to the data line and configured to determine a voltage level of the selectively equalized data symbol, a decoder configured to decode the data symbol, based on multiple decision values of the slicer circuit, and a control circuit configured to store the multiple decision values as the previous data symbol value and provide the previous data symbol value to the partial DFE circuit, wherein the control circuit is further configured to selectively turn on or off the switches of the partial DFE circuit according to the previous data symbol value.

According to a further aspect of the inventive concept, a method includes receiving a data symbol having multiple voltage levels through a data line, the data symbol being modulated according to PAM and encoded according to MTA coding that prevents an MT event from occurring between symbols, and the multiple voltage levels including a highest level and a lowest level, selectively equalizing the data symbol based on a previous data symbol value by using a partial DFE circuit, comparing the equalized data symbol with middle reference voltage levels by using multiple comparator circuits, providing multiple decision values as a result of the comparison, decoding the data symbol based on the multiple decision values, storing the multiple decision values as the previous data symbol value, and, when the previous data symbol value corresponds to the lowest level, disabling a comparator circuit that decides the highest level, from among the multiple comparator circuits.

BRIEF DESCRIPTION OF THE DRAWINGS

Embodiments will be more clearly understood from the following detailed description taken in conjunction with the accompanying drawings in which:

FIGS. 5 to 7 are diagrams illustrating slicer circuitry in FIG. 4;

DETAILED DESCRIPTION OF THE EMBODIMENTS

Figures 1, 2:
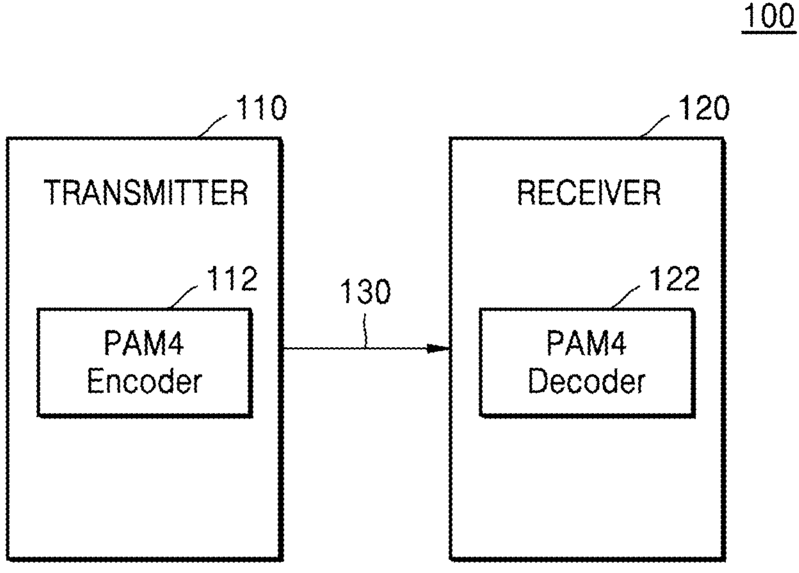
FIG. 1 is a block diagram of an apparatus including a transmitter and a receiver, according to embodiments.
FIG. 2 is a diagram illustrating the symbol levels of a pulse-amplitude modulation 4-level (PAM4) with respect to 2-bit streams.

Multi-level signaling described herein may be used to compress a bandwidth, which is used to transmit data at a given bit rate. In a simple binary method, two voltage levels are usually used to represent 1 and 0. In this case, a symbol rate may be the same as a bit rate. In comparison, in multi-level signaling, "m" symbols may be used to express data such that each symbol represents more than one bit of data. Consequently, a symbol rate is less than a bit rate, and accordingly, a bandwidth may be compressed. In other words, multi-level signaling may be used to increase a data rate without an increase in a data transmission frequency. Pulse amplitude modulation (PAM) is an example of multi-level signaling. In PAM, a multi-level signal may represent multiple bits of data. In PAM, the number of pulse amplitudes may be to the power of 2. For example, there may be 22 possible pulse amplitudes in 4-level PAM (i.e., PAM4) and 23 possible pulse amplitudes in 8-level PAM (i.e., PAM8). However, the inventive concept is not limited thereto and may be applied to PAM (K) in which there are K possible pulse amplitudes, where K is a natural number of at least 3.

For PAM4 signaling described herein, maximum transition avoidance (MTA) coding may be provided to prevent a maximum transition (MT) event, such as transition from symbol level −3 to symbol level +3 or transition from symbol level +3 to symbol level −3, from occurring between PAM4 symbols. A receiver may include at least one slicer circuit (or a comparator circuit), which determines the symbol level of a currently received data symbol. When determining the symbol level of the current data symbol, the receiver may disable a part of a slicer circuit (or a comparator circuit), which is used to decide a minimum symbol level (e.g., symbol level −3), when a previous data symbol is a maximum symbol level (e.g., symbol level +3) and may disable a part of the slicer circuit (the comparator circuit), which is used to decide the maximum symbol level (symbol level +3), when the previous data symbol is the minimum symbol level (symbol level −3). Accordingly, the receiver may reduce power consumption by having a slicer circuit (or a comparator circuit) selectively disabled.

According to aspects of the inventive concept, decision feedback equalization (DFE) may be applied to signals received by a receiver to reduce inter-symbol interference (ISI) and other signal integrity issues. ISI may cause a bit in a data signal to interfere with a subsequent bit in the data signal and be distorted. A bit in a data signal may be received as a distorted signal having residue of a previous bit. ISI may be prominent when a data rate increases, and correspondingly, a pulse width indicating a data bit decreases. DFE may be provided for subtraction of the residue of a previously read data bit in order to determine a current data bit in a received signal. In some embodiments, DFE may be provided for addition of an increase in a previously read data bit in order to determine a current data bit in a received signal. A receiver may reduce power consumption and increase the size of a data eye by using DFE circuits, which are selectively activated as switches of partial DFE circuitry are selectively turned on or off.

FIG. 1 is a block diagram of an apparatus including a transmitter and a receiver, according to embodiments.

Referring to FIG. 1, an apparatus 100 may include a transmitter 110 and a receiver 120. The apparatus 100 may refer to a computing apparatus, which includes an integrated circuit, an electronic device or system, a smartphone, a tablet personal computer (PC), a computer, a server, a workstation, a portable communication terminal, a personal digital assistant (PDA), a portable multimedia player (PMP), or other appropriate computers, a virtual machine, or a virtual computing apparatus. The apparatus 100 may correspond to some of the components included in a computing system such as a graphics card. In the present embodiment, a plurality of conceptual hardware components included in the apparatus 100 are illustrated, but the inventive concept is not limited thereto. Other configurations may be possible. The transmitter 110 may be referred to as a transmitting device and the receiver 120 may be referred to as a receiving device.

The transmitter 110 may communicate with the receiver 120 through a channel 130. The channel 130 may include a plurality of signal lines that physically or electrically connect the transmitter 110 to the receiver 120 (e.g., electrical wires or optical fibers or waveguides). The transmitter 110, the receiver 120, and the channel 130 may support PAM4 signaling that converts 2-bit streams into a single multi-level signal having four levels.

The transmitter 110 may include a PAM4 encoder 112, which converts data bursts to be transmitted to the receiver 120 into PAM4 symbols. The PAM4 encoder 112 may generate PAM4 symbols by encoding data bursts. The PAM4 encoder 112 may be implemented by hardware, firmware, software, or a combination thereof to form an encoding circuit. The transmitter 110 may further include an output driver, which drives PAM4 symbols to the channel 130. The transmitter 110 may transmit PAM4 symbols to the receiver 120 through the channel 130. Hereinafter, a "PAM4 symbol" may interchangeably be used with a "multi-level signal," which is a more generally encompassing term.

The PAM4 encoder 112 may include a lookup table, which is implemented by registers (or storage elements) storing the correlation between data burst and PAM4 symbols. The PAM4 encoder 112 may convert data bursts into PAM4 symbols by using lookup tables. PAM4 symbols may be transmitted to the channel 130 by the output driver of the transmitter 110.

The receiver 120 may include an analog front-end, which receives PAM4 symbols through the channel 130, and a PAM4 decoder 122, which decodes the received PAM4 symbols. The analog front-end may include a continuous time linear equalizer (CTLE), which compensates a signal loss occurring in the channel 130 and equalizes a response of the channel 130. Due to various factors, such as skin effect and dielectric loss, data transmitted through the channel 130 may include noise, such as ISI, and accordingly, the quality of data symbols transmitted at a high speed may deteriorate. When data passes through the channel 130, high-frequency components of the data may be more attenuated than low-frequency components of the data. The CTLE may uniformly equalize all frequency components of data symbols by amplifying the magnitudes of high-frequency components of the data symbols considering the influence of the channel 130. For example, the CTLE may include a sample-and-hold circuit and may perform sampling of data by using the sample-and-hold circuit and perform equalization based on a result of the sampling.

According to some embodiments, the receiver 120 may eliminate an offset, which is caused by layout mismatch or asymmetry of components, e.g., a transistor, a resistor, and a capacitor, which are included in the analog front-end.

The PAM4 decoder 122 may decode PAM4 symbols and recover data bursts of 2-bit streams. The PAM4 decoder 122 may be implemented by hardware, firmware, software, or a combination thereof to form a decoding circuit. The PAM4 decoder 122 may include a lookup table, which is implemented by registers (or storage elements) storing the correlation between PAM4 symbols and data burst. The PAM4 decoder 122 may recover data bursts from PAM4 symbols by using lookup tables. The lookup tables of the PAM4 decoder 122 may be configured in the same manner as the lookup tables of the PAM4 encoder 112.

FIG. 2 is a diagram illustrating PAM4 symbol levels with respect to 2-bit streams. FIG. 2 is a non-limiting example for description. Mapping between PAM4 symbols and symbol bits is described with reference to FIG. 2.

Referring to FIGS. 1 and 2, a PAM4 symbol may be constituted of a 2-bit stream and expressed as one of four symbol levels. A 2-bit PAM4 symbol may be transmitted to a signal line of the channel 130 at one of four symbol levels that are respectively expressed as level −3, level −1, level +1, and level +3. Each of the four symbol levels may have one of four voltage levels. For example, a PAM4 symbol at level +3 may be expressed as symbol bits "11" and may be set to have a highest voltage level. A PAM4 symbol at level +1 may be expressed as symbol bits "10" and may be set to have a lower voltage level than the PAM4 symbol at level +3. A PAM4 symbol at level −1 may be expressed as symbol bits "01" and may be set to have a lower voltage level than the PAM4 symbol at level +1. A PAM4 symbol at level −3 may be expressed as symbol bits "00" and may be set to have a lowest voltage level. Accordingly, the PAM4 symbol at level +3 may be set to have highest power consumption and PAM4 symbol at level −3 may be set to have lowest power consumption.

The PAM4 encoder 112 may provide MTA coding to prevent an MT event, such as transition from symbol level −3 to symbol level +3 or transition from symbol level +3 to symbol level −3, from occurring between PAM4 symbols.

Figure 3:
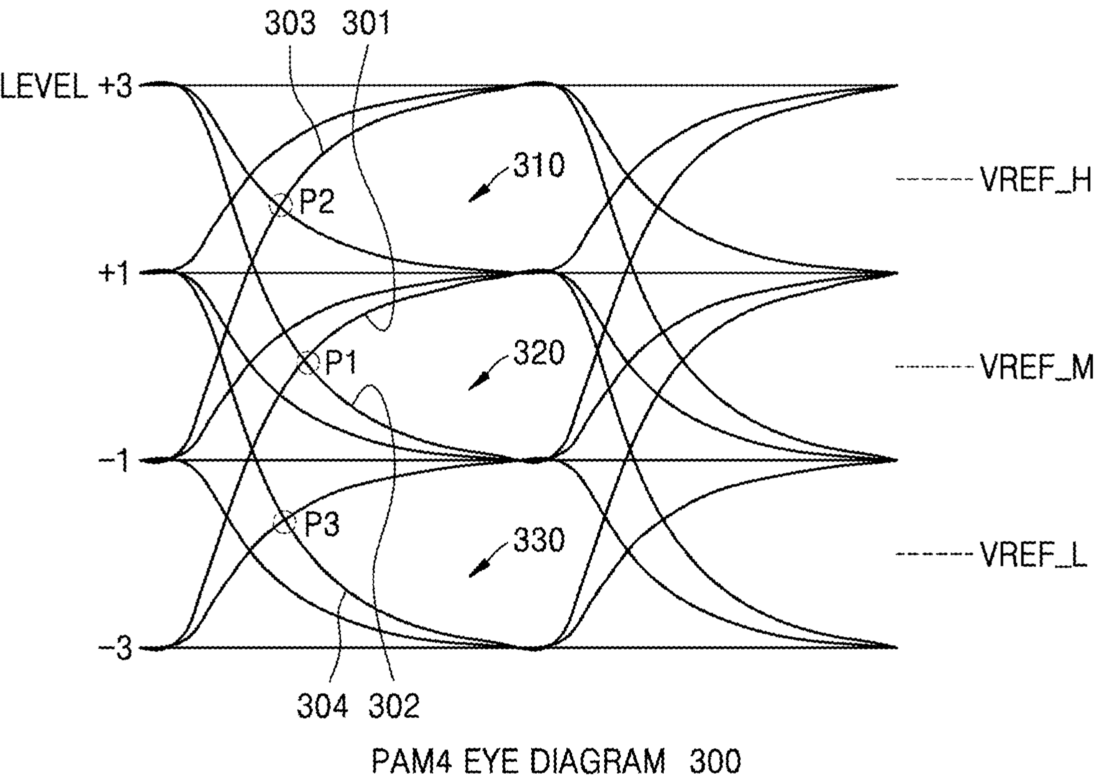
FIG. 3 is a diagram illustrating an example PAM4 eye diagram.

FIG. 3 is a diagram illustrating an example of a PAM4 eye diagram 300. PAM4 eye diagrams described below are plotted at the receiver 120 as voltages on a signal line with respect to time. In the PAM4 eye diagrams, the vertical axis is voltage and the horizontal axis is an overlapping time interval such as a 2-symbol period. However, it should be noted that the PAM4 eye diagrams are not necessarily shown at a constant rate.

Referring to FIGS. 2 and 3, in the PAM4 eye diagram 300, multiple cross points (e.g., small circles) may be seen due to transitions to multiple symbol levels. Among the multiple cross points, a cross point P1 on a transition waveform 301 from symbol level −3 to symbol level +1 and on a transition waveform 302 from symbol level +3 to symbol level −1 shows the slowest characteristic. A cross point P2 on a transition waveform 303 from symbol level −1 to symbol level +3 and a cross point P3 on a transition waveform 304 from symbol level +1 to symbol level −3 show a slow characteristic. Overall, it may be seen that the transition slope between two symbol levels is gentle. Accordingly, the sizes of eye openings shown by the transition waveforms 301, 302, 303, and 304 between two symbol levels may be reduced. Among top, middle, and bottom eye openings 310, 320, and 330 of the PAM4 eye diagram 300, the middle eye opening 320 may be small. Hereinafter, receivers for enlarging an eye opening of the PAM4 eye diagram 300 are described.

Figure 4:
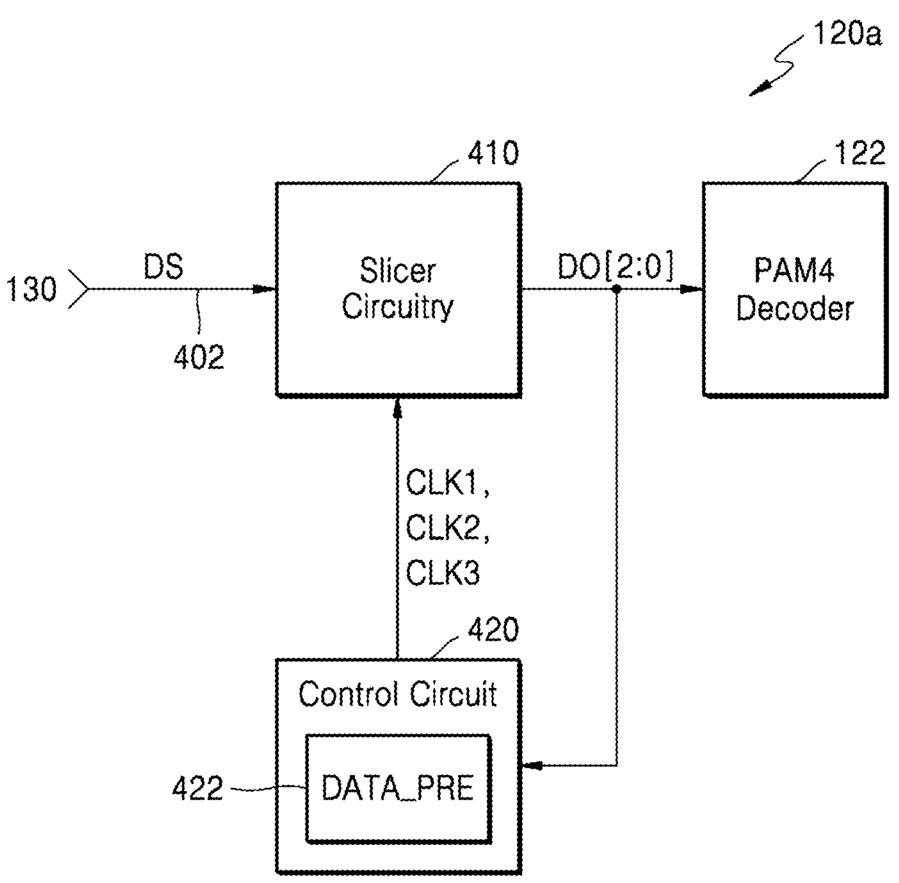
FIG. 4 is a diagram illustrating a receiver according to embodiments.
Figure 5:
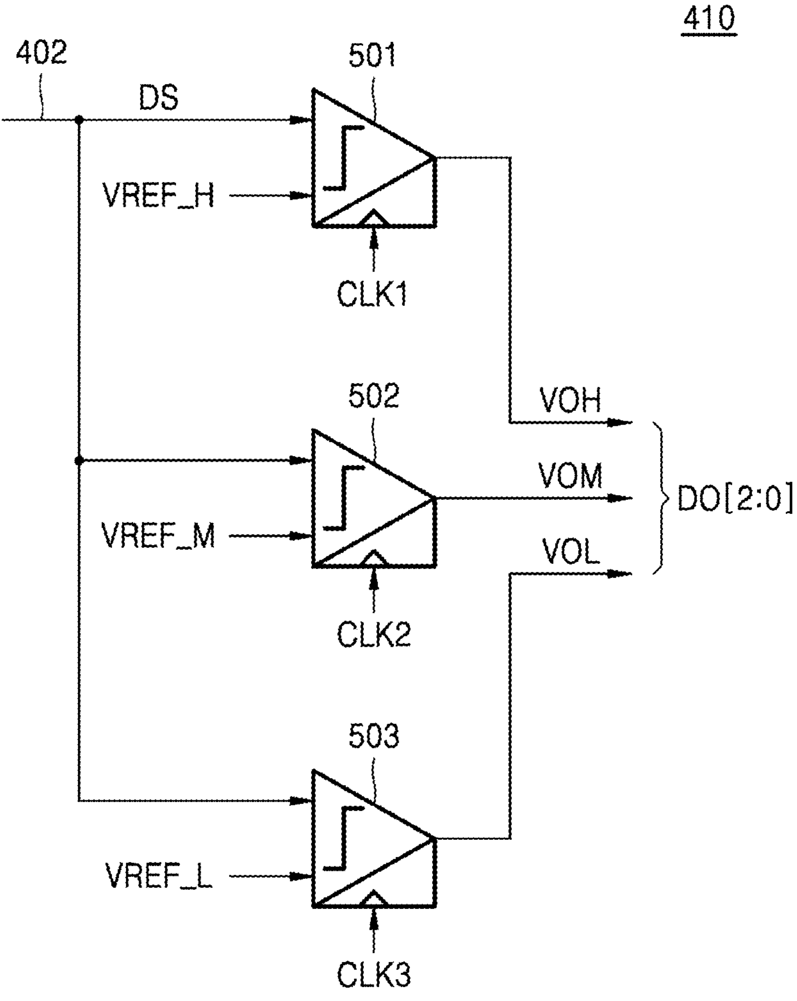
Figure 7:
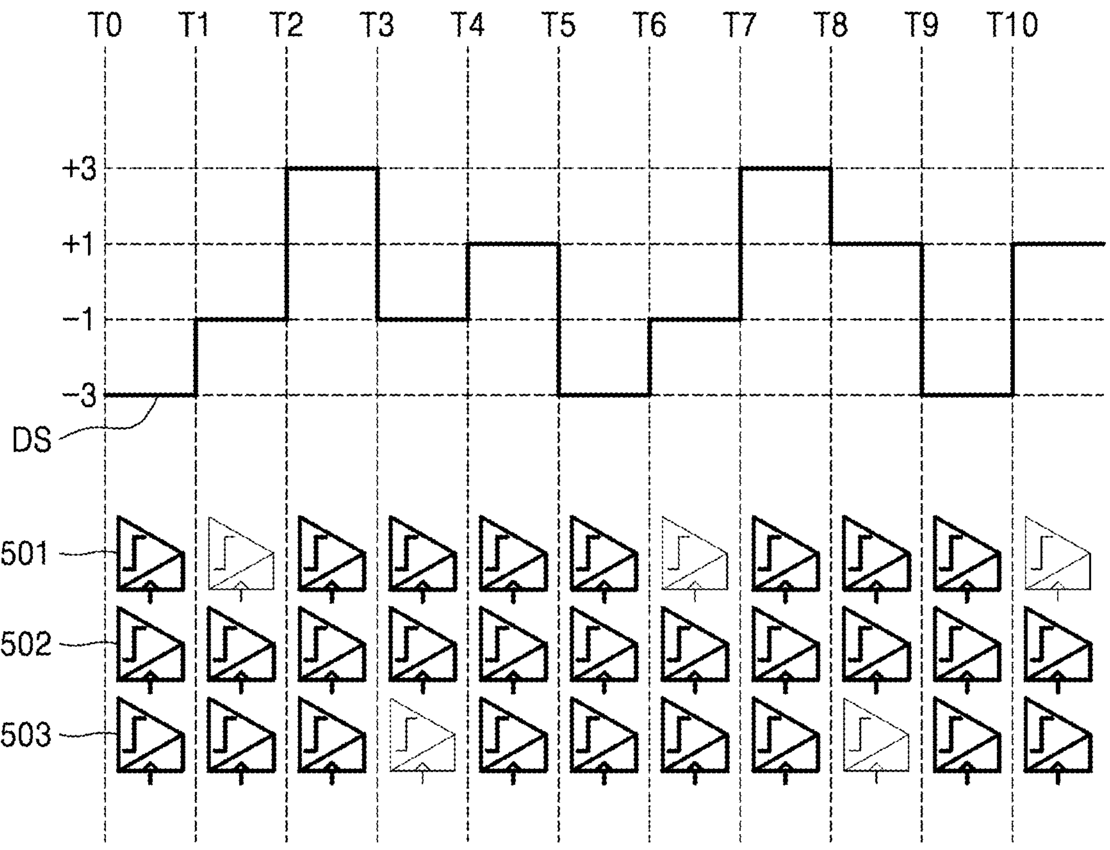

FIG. 4 is a diagram illustrating a receiver according to embodiments. FIGS. 5 to 7 are diagrams illustrating slicer circuitry in FIG. 4. Hereinafter, a suffix of a reference numeral (e.g., "a" in 120*a* or "b" in 120*b*) is used to distinguish from other circuits having the same functions. For convenience of description, a data symbol DS may interchangeably be used with a PAM4 symbol.

Referring to FIGS. 1 and 4, a receiver 120*a* may be connected to a data line 402 of the channel 130 that transmits a data symbol DS. The data symbol DS may include PAM4 symbol levels corresponding to 2-bit encoded binary data. The receiver 120*a* may include slicer circuitry 410 and the PAM4 decoder 122.

The slicer circuitry 410, which may be a comparator circuit such as a combined or composite comparator circuit, may be connected to the data line 402 and may receive the data symbol DS. The slicer circuitry 410 may determine the symbol level of the data symbol DS based on a result of comparing the data symbol DS with first to third reference voltage levels (VREF_H, VREF_M, and VREF_L in FIG. 5) in response to first to third clock signals CLK1, CLK2, and CLK3. The slicer circuitry 410 may provide output data DO[2:0] constituted of first to third decision values (VOH, VOM, and VOL in FIG. 5) to a control circuit 420 and the PAM4 decoder 122. The slicer circuitry 410 may therefore compare an input data symbol DS to a plurality of reference voltage levels to determine the data symbol level.

The PAM4 decoder 122 may generate 2-bit streams corresponding to the data symbol DS based on the output data DO[2:0] of the slicer circuitry 410. In some embodiments, the PAM4 decoder 122 may generate a 2-bit stream "11" based on the output data DO[2:0], "111", when the data symbol DS is at symbol level +3, as described below with reference to FIGS. 2 and 6. When the data symbol DS is at symbol level +1, the PAM4 decoder 122 may generate a 2-bit stream "10" based on the output data DO[2:0], "011". When the data symbol DS is at symbol level −1, the PAM4 decoder 122 may generate a 2-bit stream "01" based on the output data DO[2:0], "001". When the data symbol DS is at symbol level −3, the PAM4 decoder 122 may generate a 2-bit stream "00" based on the output data DO[2:0], "000".

The control circuit 420 may include a latch 422 which stores the output data DO[2:0] of the slicer circuitry 410 as a previous data symbol value DATA_PRE. A previous data symbol may refer to a data symbol that is most recently received through the data line 402. The control circuit 420 may selectively provide the first to third clock signals CLK1, CLK2, and CLK3 to first to third comparator circuits 501, 502, and 503 (in FIG. 5), respectively, according to the previous data symbol value DATA_PRE stored in the latch 422, wherein the first to third clock signals CLK1, CLK2, and CLK3 are used to determine the symbol level of the data symbol DS which is currently received through the data line 402.

Referring to FIG. 5, the slicer circuitry 410 may include a plurality of comparator circuits, such as the first comparator circuit 501, the second comparator circuit 502, and the third comparator circuit 503. For example, the slicer circuitry 410 may be a comparator circuit that includes a first comparator (501), second comparator (502), and third comparator (503).

The first comparator circuit 501 may compare the data symbol DS with a first reference voltage level VREF_H in response to the first clock signal CLK1 and output a first decision value VOH. As shown in FIG. 3, the first reference voltage level VREF_H may be a voltage level between symbol level +1 and symbol level +3.

The second comparator circuit 502 may compare the data symbol DS with a second reference voltage level VREF_M in response to the second clock signal CLK2 and output a second decision value VOM. As shown in FIG. 3, the second reference voltage level VREF_M may be a voltage level between symbol level −1 and symbol level +1.

The third comparator circuit 503 may compare the data symbol DS with a third reference voltage level VREF_L in response to the third clock signal CLK3 and output a third decision value VOL. As shown in FIG. 3, the third reference voltage level VREF_L may be a voltage level between symbol level-3 and symbol level-1.

As shown in FIG. 6, the slicer circuitry 410 may output all of the first decision value VOH, the second decision value VOM, and the third decision value VOL as "1" when the data symbol DS is at symbol level +3. When the data symbol DS is at symbol level +1, the first decision value VOH may be output as "0" and the second decision value VOM and the third decision value VOL may be output as "1". When the data symbol DS is at symbol level −1, the first decision value VOH and the second decision value VOM may be output as "0" and the third decision value VOL may be output as "1". When the data symbol DS is at symbol level −3, all the first decision value VOH, the second decision value VOM, and the third decision value VOL may be output as "0".

In some embodiments, when the previous data symbol value DATA_PRE is "111", the control circuit 420 may recognize that symbol level −3 is excluded from the data symbol DS currently received through the data line 402, according to MTA coding configured so that there is no MT event. Accordingly, in one embodiment, when the previous data symbol value DATA_PRE is "111", the control circuit 420 does not provide the third comparator circuit 503 with the third clock signal CLK3 which is used to decide symbol level −3 (marked with X).

In some embodiments, when the previous data symbol value DATA_PRE is "000", the control circuit 420 may recognize that symbol level +3 is excluded from the data symbol DS currently received through the data line 402, according to MTA coding configured so that there is no MT event. Accordingly, in one embodiment, when the previous data symbol value DATA_PRE is "000", the control circuit 420 does not provide the first comparator circuit 501 with the first clock signal CLK1 which is used to decide symbol level +3 (marked with X).

Referring to FIG. 7, the receiver 120*a* may sequentially receive data symbols DS through the data line 402. For example, the receiver 120*a* may receive symbol level −3 at a time point TO and symbol level −1 at a time point T1. At the time point T1, the control circuit 420 does not provide the first clock signal CLK1 to the first comparator circuit 501 according to the previous data symbol value DATA_PRE, "000", corresponding to symbol level −3 at the time point TO, and thus, the first comparator circuit 501 may be disabled. In the drawings, to simplify circuit connection relationships, components in a disabled state are shown faintly to indicate that they are not connected.

The receiver 120*a* may receive symbol level +3 at a time point T2 and symbol level −1 at a time point T3. At the time point T2, the control circuit 420 may respectively provide the first to third clock signals CLK1, CLK2, and CLK3 to the first to third comparator circuits 501, 502, and 503 according to the previous data symbol value DATA_PRE, "001", corresponding to symbol level −1 at the time point T1, and thus, the first to third comparator circuits 501, 502, and 503 may be enabled. At the time point T3, the control circuit 420 does not provide the third clock signal CLK3 to the third comparator circuit 503 according to the previous data symbol value DATA_PRE, "111", corresponding to symbol level +3 at the time point T2, and thus, the third comparator circuit 503 may be disabled.

The receiver 120*a* may receive symbol level +1 at a time point T4 and symbol level −3 at a time point T5. At the time point T4, the control circuit 420 may respectively provide the first to third clock signals CLK1, CLK2, and CLK3 to the first to third comparator circuits 501, 502, and 503 according to the previous data symbol value DATA_PRE, "001", corresponding to symbol level −1 at the time point T3, and thus, the first to third comparator circuits 501, 502, and 503 may be enabled. At the time point T5, the control circuit 420 may respectively provide the first to third clock signals CLK1, CLK2, and CLK3 to the first to third comparator circuits 501, 502, and 503 according to the previous data symbol value DATA_PRE, "011", corresponding to symbol level +1 at the time point T4, and thus, the first to third comparator circuits 501, 502, and 503 may be enabled.

The receiver 120*a* may receive symbol level −1 at a time point T6 and symbol level +3 at a time point T7. At the time point T6, the control circuit 420 does not provide the first clock signal CLK1 to the first comparator circuit 501 according to the previous data symbol value DATA_PRE, "000", corresponding to symbol level −3 at the time point T5, and thus, the first comparator circuit 501 may be disabled. At the time point T7, the control circuit 420 may respectively provide the first to third clock signals CLK1, CLK2, and CLK3 to the first to third comparator circuits 501, 502, and 503 according to the previous data symbol value DATA_PRE, "001", corresponding to symbol level −1 at the time point T6, and thus, the first to third comparator circuits 501, 502, and 503 may be enabled.

The receiver 120*a* may receive symbol level +1 at a time point T8, symbol level −3 at a time point T9, and symbol level +1 at a time point T10. At the time point T8, the control circuit 420 does not provide the third clock signal CLK3 to the third comparator circuit 503 according to the previous data symbol value DATA_PRE, "111", corresponding to symbol level +3 at the time point T7, and thus, the third comparator circuit 503 may be disabled. At the time point T9, the control circuit 420 may respectively provide the first to third clock signals CLK1, CLK2, and CLK3 to the first to third comparator circuits 501, 502, and 503 according to the previous data symbol value DATA_PRE, "011", corresponding to symbol level +1 at the time point T8, and thus, the first to third comparator circuits 501, 502, and 503 may be enabled. At the time point T10, the control circuit 420 does not provide the first clock signal CLK1 to the first comparator circuit 501 according to the previous data symbol value DATA_PRE, "000", corresponding to symbol level −3 at the time point T9, and thus, the first comparator circuit 501 may be disabled.

When receiving PAM4 symbol levels of the MTA coding, the receiver 120*a* may operate such that the third comparator circuit 503 among the first to third comparator circuits 501, 502, and 503 of the slicer circuitry 410 is disabled when the previous data symbol value DATA_PRE corresponds to symbol level +3. The receiver 120*a* may operate such that the first comparator circuit 501 among the first to third comparator circuits 501, 502, and 503 of the slicer circuitry 410 is disabled when the previous data symbol value DATA_PRE corresponds to symbol level −3.

Through such operations, instead of enabling and operating all of the first to third comparator circuits 501, 502, and 503 of the slicer circuitry 410, the receiver 120*a* may selectively disable the first comparator circuit 501 or the third comparator circuit 503 according to the previous data symbol value DATA_PRE, thereby reducing power consumption.

Figure 8:
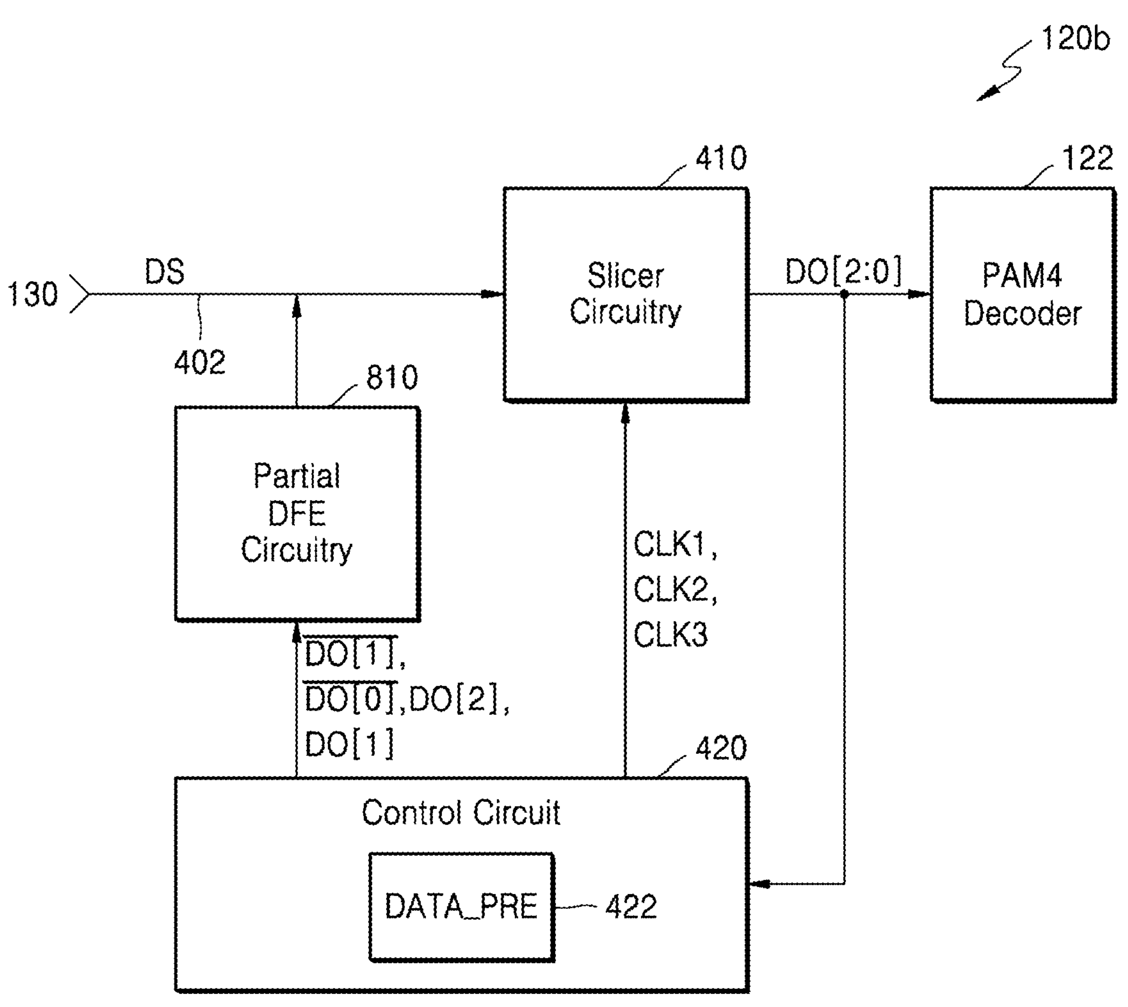
FIG. 8 is a diagram illustrating a receiver according to embodiments.
Figure 9:
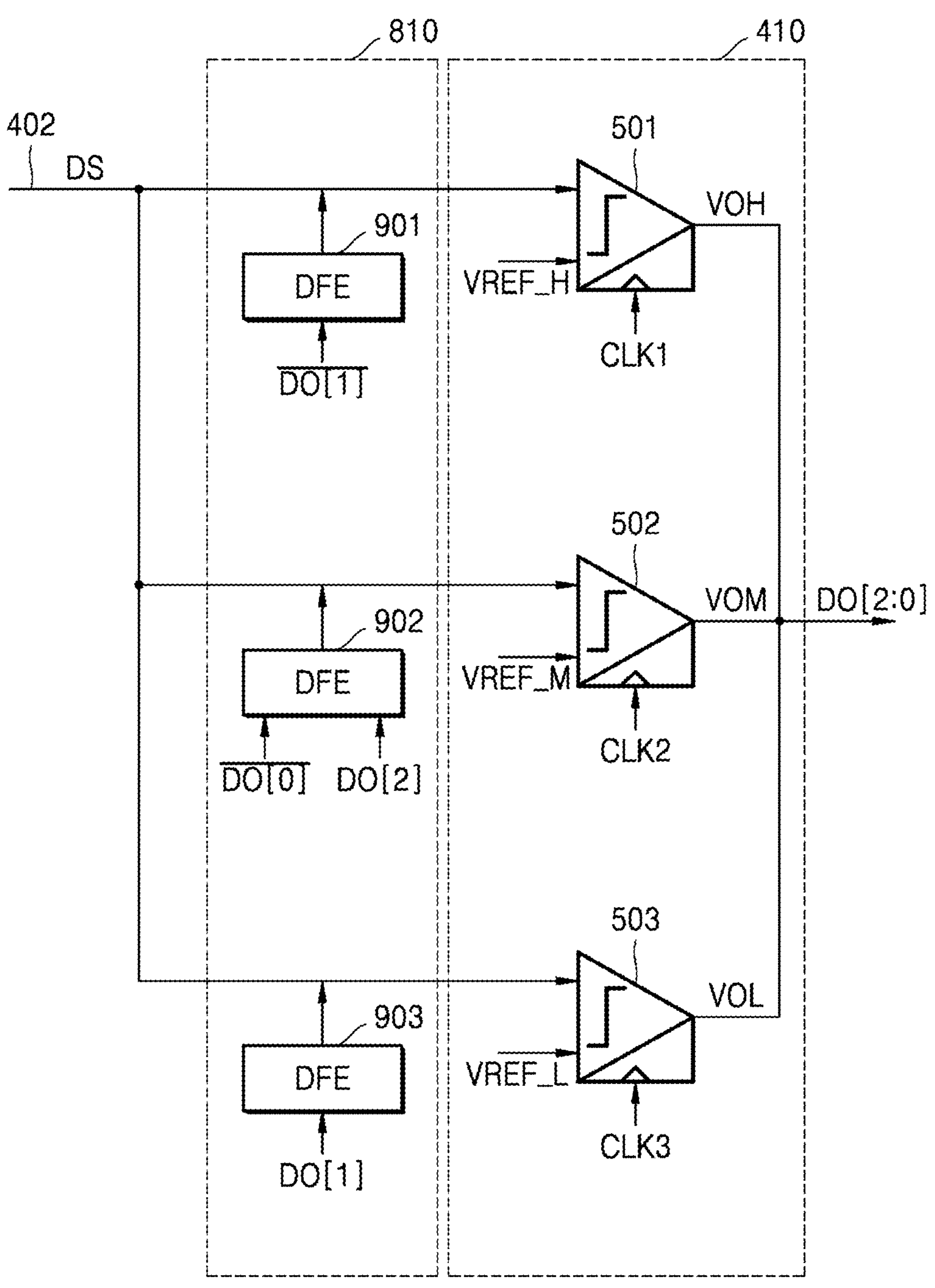
FIGS. 9 and 10 are diagrams illustrating partial decision feedback equalization (DFE) circuitry in FIG. 8.
Figure 10:
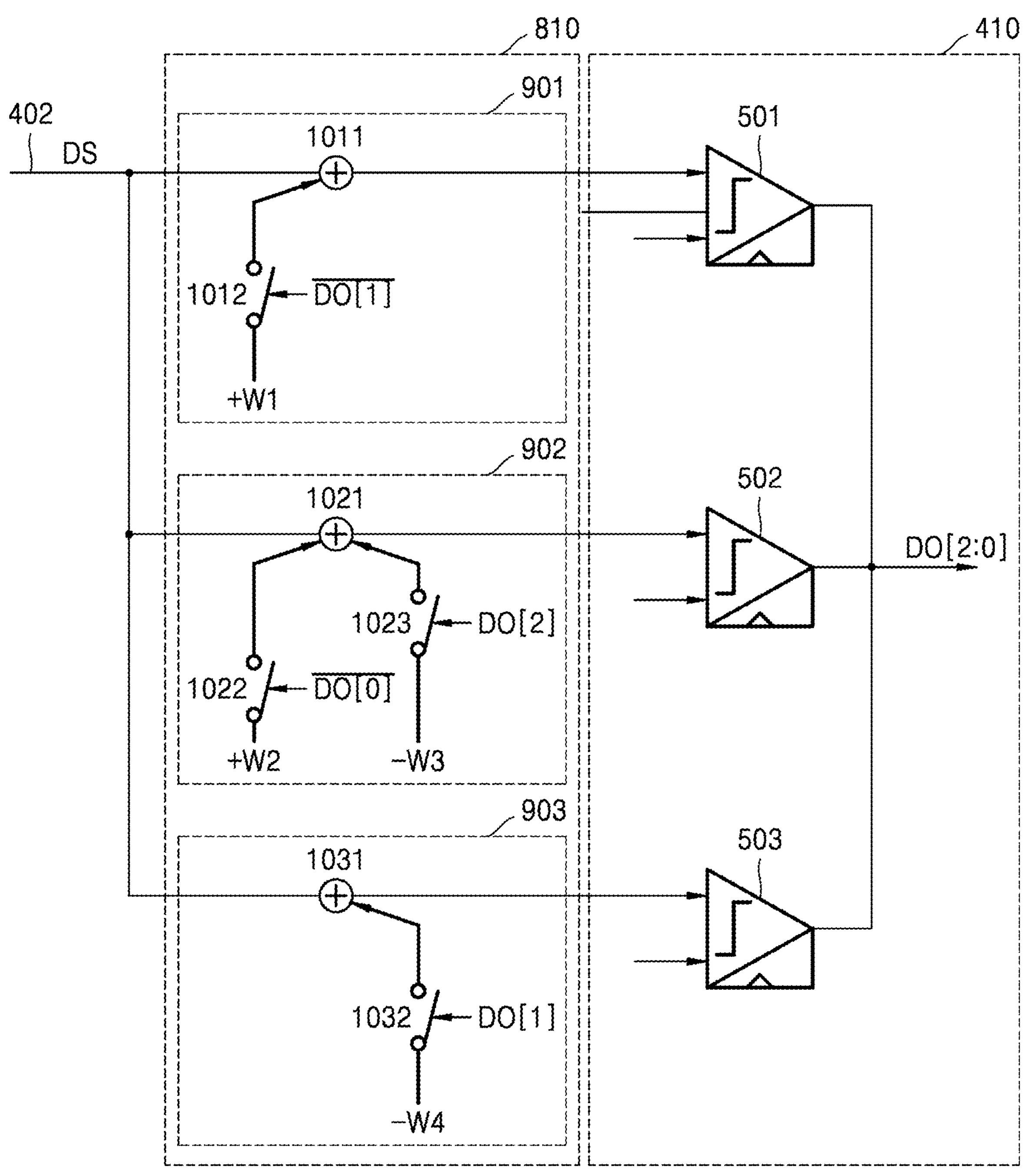

FIG. 8 is a diagram illustrating a receiver 120*b* according to embodiments. FIGS. 9 and 10 are diagrams illustrating partial DFE circuitry 810 in FIG. 8. Redundant descriptions given with reference to FIG. 4 will be omitted from the description of the receiver 120*b*.

Referring to FIG. 8, the receiver 120*b* may include the slicer circuitry 410, the control circuit 420, and the PAM4 decoder 122, like the receiver 120*a* of FIG. 4, and may further include the partial DFE circuitry 810. The slicer circuitry 410 may determine the symbol level of the data symbol DS, based on a result of comparing the data symbol DS with the first to third reference voltage levels VREF_H, VREF_M, and VREF_L (in FIG. 5) in response to the first to third clock signals CLK1, CLK2, and CLK3 provided from the control circuit 420. The PAM4 decoder 122 may generate 2-bit streams corresponding to the data symbol DS based on the output data DO[2:0] constituted of the first to third decision values VOH, VOM, and VOL (in FIG. 5). The control circuit 420 may store the output data DO[2:0] of the slicer circuitry 410 in the latch 422 as the previous data symbol value DATA_PRE. The control circuit 420 may selectively provide the first to third clock signals CLK1, CLK2, and CLK3 to the first to third comparator circuits 501, 502, and 503 (in FIG. 5), respectively, according to the previous data symbol value DATA_PRE stored in the latch 422, wherein the first to third clock signals CLK1, CLK2, and CLK3 are used to determine the symbol level of the data symbol DS which is currently received through the data line 402. When the previous data symbol value DATA_PRE stored in the latch 422 corresponds to symbol level +3, the control circuit 420 may not provide the third clock signal CLK3 to disable the third comparator circuit 503 among the first to third comparator circuits 501, 502, and 503 of the slicer circuitry 410. When the previous data symbol value DATA_PRE stored in the latch 422 corresponds to symbol level −3, the control circuit 420 may not provide the first clock signal CLK1 to disable the first comparator circuit 501 among the first to third comparator circuits 501, 502, and 503 of the slicer circuitry 410.

The partial DFE circuitry 810 may be implemented to equalize the symbol level of the data symbol DS that is currently received through the data line 402. The partial DFE circuitry 810 may be configured to adjust the direction of increase or decrease and/or the degree of change in the data symbol DS. The partial DFE circuitry 810 may be connected between the data line 402 and the control circuit 420. The control circuit 420 may provide the partial DFE circuitry 810 with/DO[1] output data, /DO[0] output data, DO[2] output data, and DO[1] output data, which are derived from the output data DO[2:0] corresponding to the previous data symbol value DATA_PRE stored in the latch 422. The/DO[1] output data may be inverted data of the DO[1] output data. The/DO[0] output data may be inverted data of the DO[0] output data.

As shown in FIG. 9, the partial DFE circuitry 810 may include a first DFE circuit 901, a second DFE circuit 902, and a third DFE circuit 903. The first DFE circuit 901 may be activated or switched to be connected to the data line 402, based on the/DO[1] output data. The second DFE circuit 902 may be activated or switched to be connected to the data line 402, based on the/DO[0] output data or the DO[2] output data. The third DFE circuit 903 may be activated or switched to be connected to the data line 402, based on the DO[1] output data.

Referring to FIG. 10, the first DFE circuit 901 may include an adder 1011 and a switch 1012. The first DFE circuit 901 may be enabled or disabled through the switch 1012 that is controlled by the/DO[1] output data. The adder 1011 may be connected to the data line 402, and the switch 1012 may provide a first weight value +W1 to the data line 402 in response to the/DO[1] output data. When the first DFE circuit 901 is activated, the adder 1011 may add the first weight value +W1 to the data symbol DS before forwarding the data symbol DS to the first comparator circuit 501 of the slicer circuit 410.

In some embodiments, the first DFE circuit 901 may be activated when the switch 1012 is turned on in response to the/DO[1] output data at a logic high level and may be deactivated when the switch 1012 is turned off in response to the/DO[1] output data at a logic low level. When the first DFE circuit 901 is activated, the first DFE circuit 901 may add a W1 weight value to the data symbol DS on the data line 402. This is just an example for clear understanding. The W1 weight value may be added to or subtracted from the data symbol DS on the data line 402 by the first DFE circuit 901.

The second DFE circuit 902 may include an adder 1021, a first switch 1022, and a second switch 1023. The second DFE circuit 902 may be enabled or disabled through the first switch 1022 that is controlled by the/DO[0] output data or the second switch 1023 that is controlled by the DO[2] output data. The adder 1021 may be connected to the data line 402. The first switch 1022 may provide a second weight value +W2 to the data line 402 in response to the/DO[0] output data. The second switch 1023 may provide a third weight value −W3 to the data line 402 in response to the DO[2] output data. When the second DFE circuit 902 is activated by the first switch 1022, the adder 1021 may add the second weight value +W2 to the data symbol DS before forwarding the data symbol DS to the second comparator circuit 502 of the slicer circuit 410. When the second DFE circuit 902 is activated by the second switch 1023, the adder 1021 may add the third weight value −W3 to the data symbol DS before forwarding the data symbol DS to the second comparator circuit 502 of the slicer circuit 410. Adding the third weight value −W3 to the data symbol DS may refer to subtracting a W3 weight value from the data symbol DS.

In some embodiments, the second DFE circuit 902 may be activated when the first switch 1022 is turned on in response to the/DO[0] output data at a logic high level or when the second switch 1023 is turned on in response to the DO[2] output data at a logic high level. When both the/DO[0] output data and the DO[2] output data are at a logic low level, the first and second switches 1022 and 1023 may be turned off and the second DFE circuit 902 may be deactivated. When the second DFE circuit 902 is activated by the first switch 1022, the second DFE circuit 902 may add a W2 weight value to the data symbol DS on the data line 402. This is just an example for clear understanding. The W2 weight value may be added to or subtracted from the data symbol DS on the data line 402 by the second DFE circuit 902. When the second DFE circuit 902 is activated by the second switch 1023, the second DFE circuit 902 may add a −W3 weight value to the data symbol DS on the data line 402. This is just an example for clear understanding. The W3 weight value may be added to or subtracted from the data symbol DS on the data line 402 by the second DFE circuit 902.

The third DFE circuit 903 may include an adder 1031 and a switch 1032. The third DFE circuit 903 may be enabled or disabled through the switch 1032 that is controlled by the DO[1] output data. The adder 1031 may be connected to the data line 402, and the switch 1032 may provide a fourth weight value +W4 to the data line 402 in response to the DO[1] output data. When the third DFE circuit 903 is activated, the adder 1031 may add the fourth weight value −W4 to the data symbol DS before forwarding the data symbol DS to the third comparator circuit 503 of the slicer circuit 410. Adding the fourth weight value −W4 to the data symbol DS may refer to subtracting a W4 weight value from the data symbol DS.

In some embodiments, the third DFE circuit 903 may be activated when the switch 1032 is turned on in response to the DO[1] output data at a logic high level and may be deactivated when the switch 1032 is turned off in response to the DO[1] output data at a logic low level. When the third DFE circuit 903 is activated, the third DFE circuit 903 may subtract the W4 weight value from the data symbol DS on the data line 402. This is just an example for clear understanding. The W4 weight value may be added to or subtracted from the data symbol DS on the data line 402 by the third DFE circuit 903.

Figure 11:
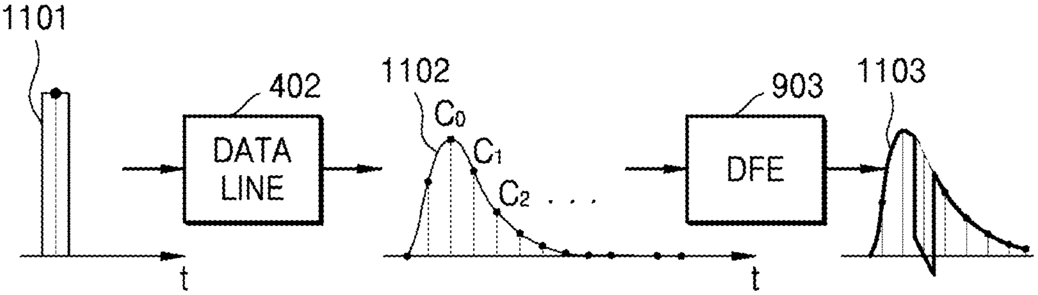
FIG. 11 is a diagram illustrating the effect of a DFE circuit on a data line, according to embodiments.

FIG. 11 is a diagram illustrating the effect of a DFE circuit on a data line, according to embodiments. FIG. 11 illustrates the effect of the third DFE circuit 903 among the first to third DFE circuits 901, 902, and 903 in FIG. 10. The effect of the third DFE circuit 903 may be equally applied to the other DFE circuits, i.e., the first and second DFE circuit 901 and 902.

Referring to FIGS. 10 and 11, the data line 402 may suffer loss and signal reflection. In the data line 402, ISI may cause one bit in data to interfere with and distort a subsequent bit in the data. A bit in a data signal 1101 transmitted through the data line 402 may be received as a distorted signal 1102 having the residue of a previous bit. ISI may be prominent when a data rate increases, and correspondingly, a pulse width indicating a data bit decreases. Values of the distorted signal 1102, which are received at respective sampling points (e.g., rising edges of the first, second, and third clock signals CLK1, CLK2, and CLK3) of the slicer circuit 410, may be referred to as tap values, e.g., a main tap value $C_0$, a first tap value $C_1$, and a second tap value $C_2$, which correspond to the data signal 1102 transmitted through the data line 402.

The third DFE circuit 903 may subtract the residue of a previous bit, e.g., the first tap value $C_1$, from the distorted signal 1102, thereby equalizing the distorted signal 1102 and generating an equalized signal 1103. Although FIG. 11 illustrates an example in which only the first tap value $C_1$ is equalized by the third DFE circuit 903, this is just for convenience of description. The inventive concept is not limited thereto. According to embodiments, the third DFE circuit 903 may include a plurality of DFE taps that respectively multiply samples, which are delayed by a plurality of delay units, by tap values (e.g., $C_1$ and $C_2$).

In some embodiments, the first to fourth weight values +W1, +W2, −W3, and −W4, which are provided to the data line 402 by the first to third DFE circuits 901, 902, and 903, may be correlated with the previous data symbol value DATA_PRE. The control circuit 420 may set the first to fourth weight values +W1, +W2, −W3, and −W4 based on the previous data symbol value DATA_PRE stored in the latch 422. In an embodiment, the control circuit 420 may set the first to fourth weight values +W1, +W2, −W3, and −W4 such that the absolute values of the first to fourth weight values +W1, +W2, −W3, and −W4 are the same. This setting is to enlarge an eye opening when the top, middle, and bottom eye openings 310, 320, and 330 of the PAM4 eye diagram 300 described with reference to FIG. 3 are symmetrical. In some embodiments, when the top, middle, and bottom eye openings 310, 320, and 330 of the PAM4 eye diagram 300 are asymmetrical, the control circuit 420 may be set such that the absolute values of the first to fourth weight values +W1, +W2, −W3, and −W4 are different. This means that the first to third DFE circuits 901, 902, and 903 may enlarge an eye opening using the first to fourth weight values +W1, +W2, −W3, and −W4 having different weights.

Figure 12:
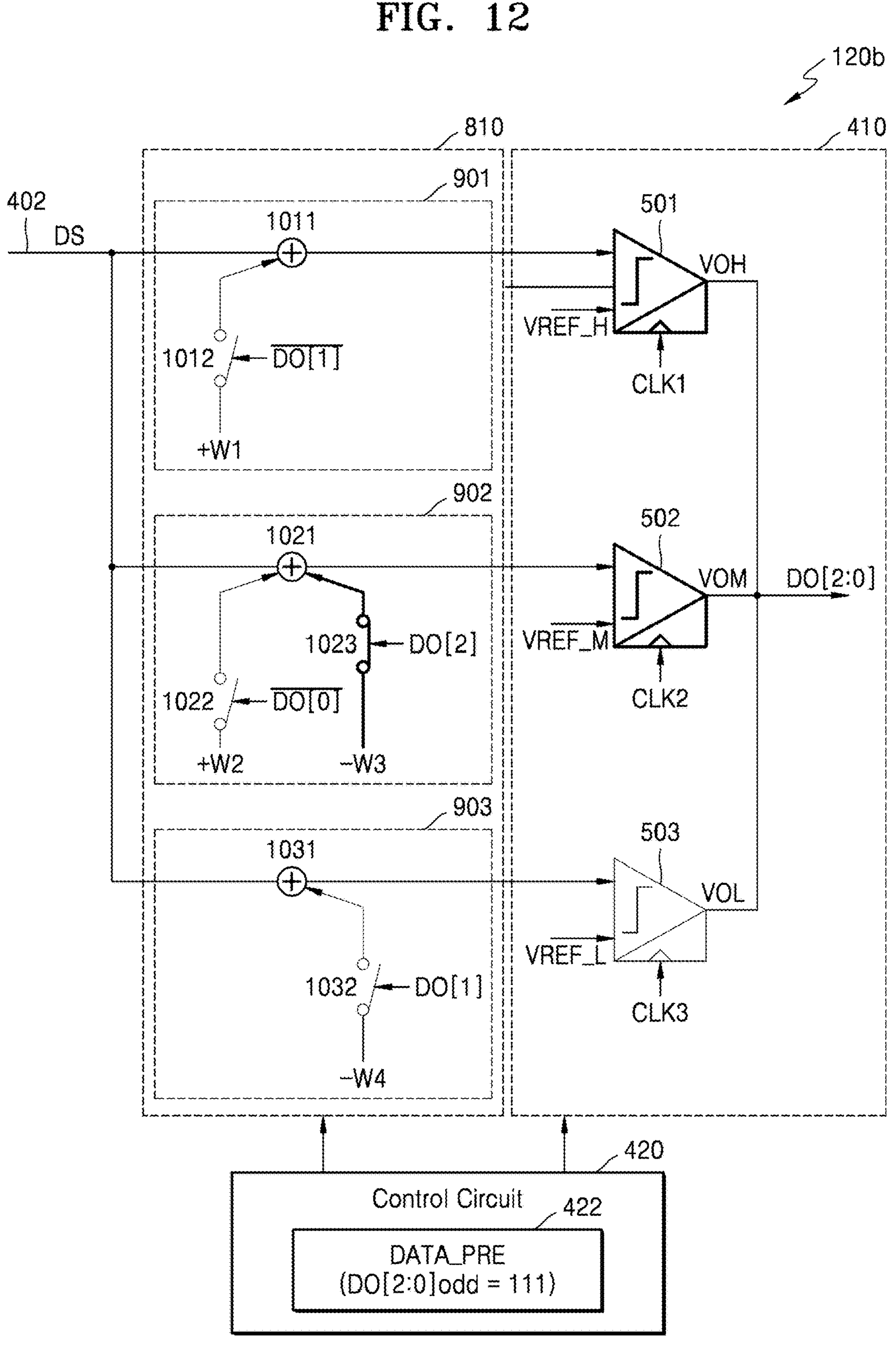
FIGS. 12 and 13 are diagrams illustrating an operation of partial DFE circuitry, according to embodiments.
Figure 13:
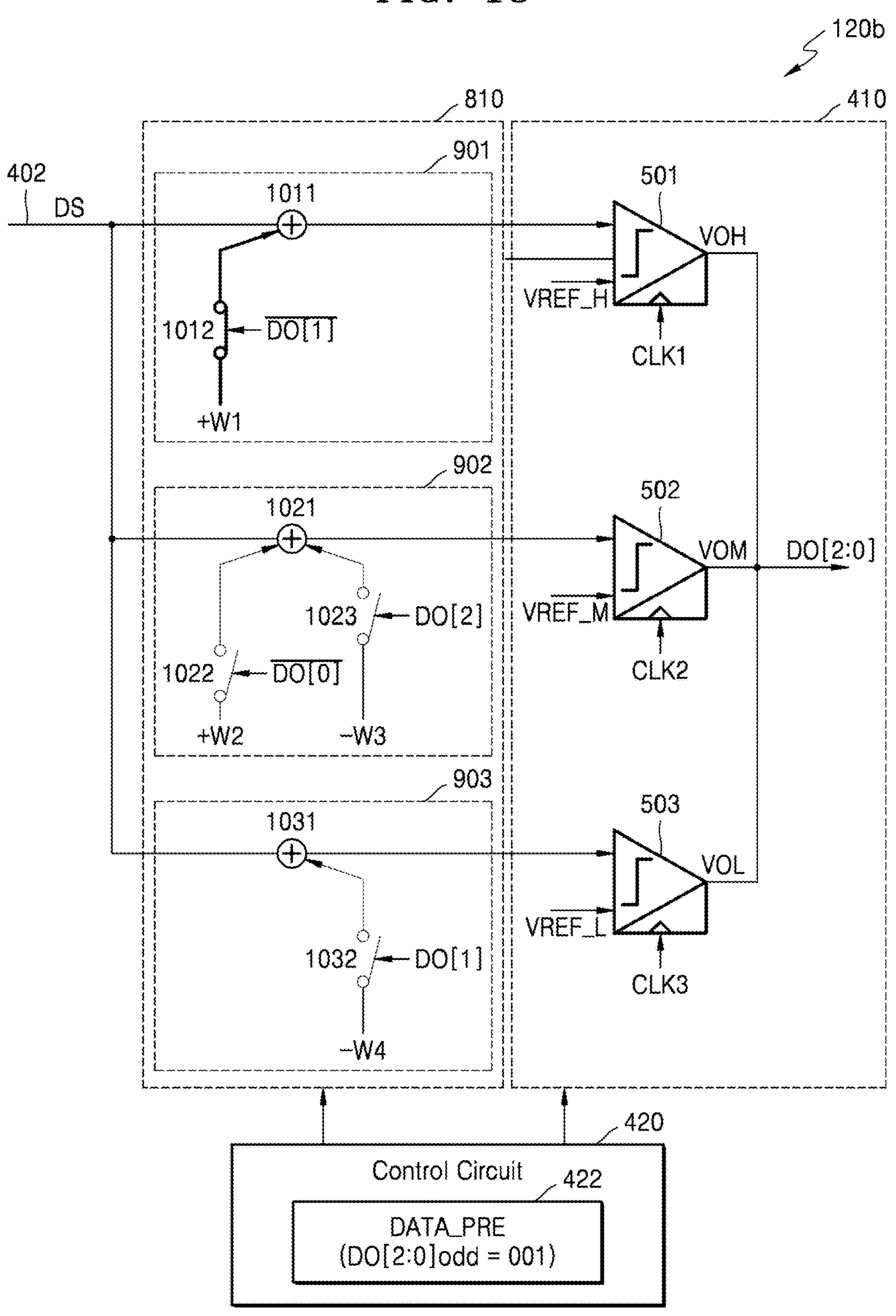
Figure 14A:
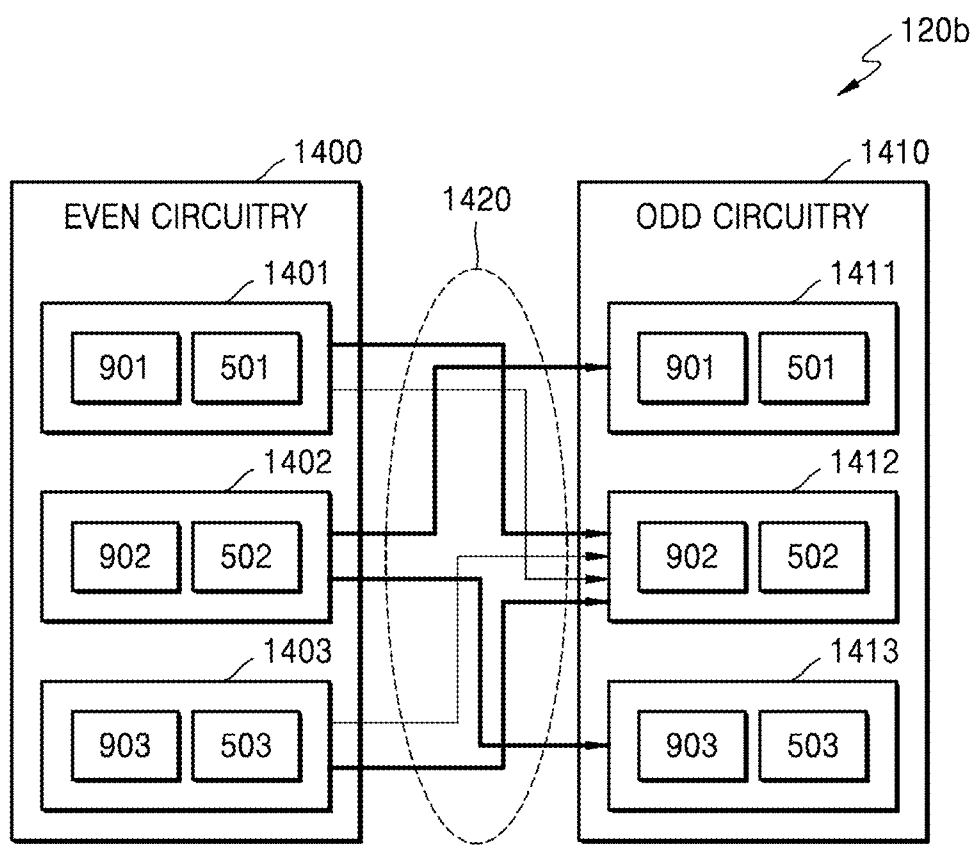
FIGS. 14A and 14B illustrate routing structures of a receiver using the partial DFE circuitry in FIG. 10.
Figure 14B:
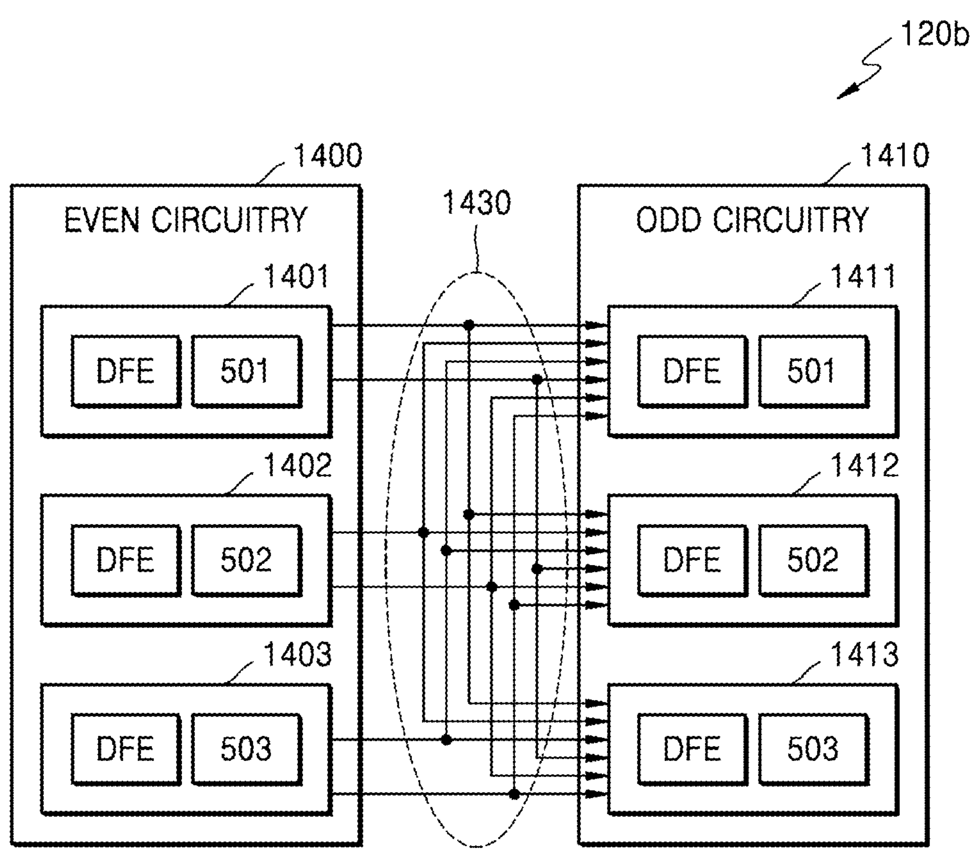

FIGS. 12 and 13 are diagrams illustrating the operation of partial DFE circuitry, according to embodiments. FIGS. 12 and 13 illustrate examples of operating the partial DFE circuit 810 in FIG. 10 by using a half data rate clock obtained by dividing the frequency of a data rate clock, which is set by a clock signal of the receiver 120*b* of FIG. 8. FIGS. 14A and 14B illustrate routing structures of the receiver 120*b* using the partial DFE circuitry 810 in FIG. 10. The receiver 120*b* may sequentially sample the data symbol DS, which is received through the data line 402, in response to an even clock and an odd clock. For convenience of description, an operation performed by the receiver 120*b* to determine the symbol level of the received data symbol DS may interchangeably be referred to as a sense amplifier operation, a comparison operation, or a sampling operation. In the drawings, to simplify circuit connection relationships, components in a disabled state are shown faintly to indicate that they are not connected.

Referring to FIG. 12, it is assumed that the previous data symbol value DATA_PRE sampled at a previous odd clock is stored in the latch 422 of the control circuit 420 as, for example, DO[2:0]odd=111. The previous data symbol value DATA_PRE, "111", stored in the latch 422 may indicate that a previous data symbol DS is at symbol level +3. The control circuit 420 may recognize that symbol level −3 is excluded from the data symbol DS, which is currently received through the data line 402, according to MTA coding configured so that there is no MT event and may not provide the third clock signal CLK3, which is used to decide symbol level −3, to the third comparator circuit 503 (see FIG. 6), and thus, the not provide the third clock signal CLK3 may be disabled.

The first DFE circuit 901 may be deactivated because the switch 1012 of the first DFE circuit 901 is turned off in response to the/DO[1] output data at a logic low level. In this case, the data symbol DS received through the data line 402 may be compared with the first reference voltage level VREF_H by the first comparator circuit 501 in response to the first clock signal CLK1, and the first comparator circuit 501 may output the first decision value VOH as a result of the comparison.

The first switch 1022 of the second DFE circuit 902 may be turned off in response to the DO[0] output data at a logic low level and the second switch 1023 of the second DFE circuit 902 may be turned on in response to the DO[2] output data at a logic high level, and thus, the second DFE circuit 902 may be activated. When the second DFE circuit 902 is activated by the second switch 1023 thereof, the adder 1021 thereof may add the third weight value −W3 to the data symbol DS before forwarding the data symbol DS to the second comparator circuit 502. In this case, the data symbol DS, to which the third weight value −W3 provided from the second DFE circuit 902 has been added, may be compared with the second reference voltage level VREF_M by the second comparator circuit 502 in response to the second clock signal CLK2. The second comparator circuit 502 may output the second decision value VOM as a result of the comparison.

The third DFE circuit 903 may be activated by the switch 1032 that is turned on in response to the DO[1] output data at a logic high level. However, because the third comparator circuit 503 is in a disabled state, the data symbol DS may not be transmitted to the third comparator circuit 503. In this case, the third comparator circuit 503 may hold a result of comparing a previous data symbol DS with the third reference voltage level VREF_L and may output the third decision value VOL.

Referring to FIG. 13, it is assumed that the previous data symbol value DATA_PRE sampled at a previous odd clock is stored in the latch 422 of the control circuit 420 as, for example, DO[2:0]odd=001. The first DFE circuit 901 may be activated because the switch 1012 of the first DFE circuit 901 is turned on in response to the/DO[1] output data at a logic high level. When the first DFE circuit 901 is activated, the adder 1011 of the first DFE circuit 901 may add the first weight value +W1 to the data symbol DS before forwarding the data symbol DS to the first comparator circuit 501. In this case, the data symbol DS, to which the first weight value +W1 provided from the first DFE circuit 901 has been added, may be compared with the first reference voltage level VREF_H by the first comparator circuit 501 in response to the first clock signal CLK1. The first comparator circuit 501 may output the first decision value VOH as a result of the comparison.

The first switch 1022 of the second DFE circuit 902 may be turned off in response to the DO[0] output data at a logic low level and the second switch 1023 of the second DFE circuit 902 may be turned off in response to the DO[2] output data at a logic low level, and thus, the second DFE circuit 902 may be deactivated. In this case, the data symbol DS received through the data line 402 may be compared with the second reference voltage level VREF_M by the second comparator circuit 502 in response to the second clock signal CLK2, and the second comparator circuit 502 may output the second decision value VOM as a result of the comparison.

The third DFE circuit 903 may be deactivated by the switch 1032 that is turned off in response to the DO[1] output data at a logic low level. In this case, the data symbol DS received through the data line 402 may be compared with the third reference voltage level VREF_L by the third comparator circuit 503 in response to the third clock signal CLK3, and the third comparator circuit 503 may output the third decision value VOL as a result of the comparison.

Accordingly, the receiver **120*b* of FIGS. 12 and 13 may implement the partial DFE circuitry 810 such that the first to third DFE circuits 901, 902, and 903 are selectively activated according to the previous data symbol value DATA_PRE stored in the latch 422 of the control circuit 420. This means that power consumption may be reduced compared to the case where all of the first to third DFE circuits 901, 902, and 903** are activated.

Referring to FIGS. 10 and 14A, the receiver **120*b* may be divided into even circuitry 1400 and odd circuitry 1410. The even circuitry 1400 samples the data symbol DS, which is received through the data line 402, according to an even clock, and the odd circuitry 1410 samples the data symbol DS according to an odd clock. The even circuitry 1400 may be divided into a top circuit unit 1401 including the first DFE circuit 901 and the first comparator circuit 501, a middle circuit unit 1402 including the second DFE circuit 902 and the second comparator circuit 502, and a bottom circuit unit 1403 including the third DFE circuit 903 and the third comparator circuit 503. The odd circuitry 1410 may be divided into a top circuit unit 1411 including the first DFE circuit 901 and the first comparator circuit 501, a middle circuit unit 1412 including the second DFE circuit 902 and the second comparator circuit 502, and a bottom circuit unit 1413 including the third DFE circuit 903 and the third comparator circuit 503. The top circuit units 1401 and 1411 may perform a sampling operation related to the top eye opening 310 of the PAM4 eye diagram 300 of FIG. 3. The middle circuit units 1402 and 1412 may perform a sampling operation related to the middle eye opening 320 of the PAM4 eye diagram 300 of FIG. 3. The bottom circuit units 1403 and 1413 may perform a sampling operation related to the bottom eye opening 330 of the PAM4 eye diagram 300 of FIG. 3**.

The even circuitry 1400 may perform a sampling operation on a previous data symbol DS according to an even clock. The odd circuitry 1410 may perform a sampling operation on a current data symbol DS according to an odd clock. As a result of the sampling operation of the even circuitry 1400, the output data DO[2:0] constituted of the first to third decision values VOH, VOM, and VOL for the previous data symbol DS may be provided as the previous data symbol value DATA_PRE to the first to third DFE circuits 901, 902, and 903 of the odd circuitry 1410. In the present embodiment, each of the first to third decision values VOH, VOM, and VOL may be provided as a pair of differential signals.

In a partial DFE scheme of FIG. 14A, as described above with reference to FIG. 10, the first DFE circuit 901 of the odd circuitry 1410 may receive the/DO[1] output data of the previous data symbol DS, the second DFE circuit 902 of the odd circuitry 1410 may receive the/DO[0] output data and the DO[2] output data of the previous data symbol DS, and the third DFE circuit 903 of the odd circuitry 1410 may receive the DO[1] output data of the previous data symbol DS. Accordingly, signal routing 1420 between the even circuitry 1400 and the odd circuitry 1410 may be simplified. Referring to FIG. 14B, in a DFE scheme according to the related art, each of the first to third DFE circuits may perform a sampling operation based on all of the DO[0], /DO[0], DO[1], /DO[1], DO[2], and/DO[2] output data of the previous data symbol DS. This means that the signal routing 1420 of the partial DFE scheme of FIG. 14A is less complex than signal routing 1430 for receiving all of the DO[0], /DO[0], DO[1], /DO[1], DO[2], and/DO[2] output data of the previous data symbol DS in the DFE scheme of FIG. 14B according to the related art. Accordingly, the partial DFE scheme of FIG. 14A may be beneficial for high-speed operation by reducing the loading capacitance of signal lines.

Figure 15:
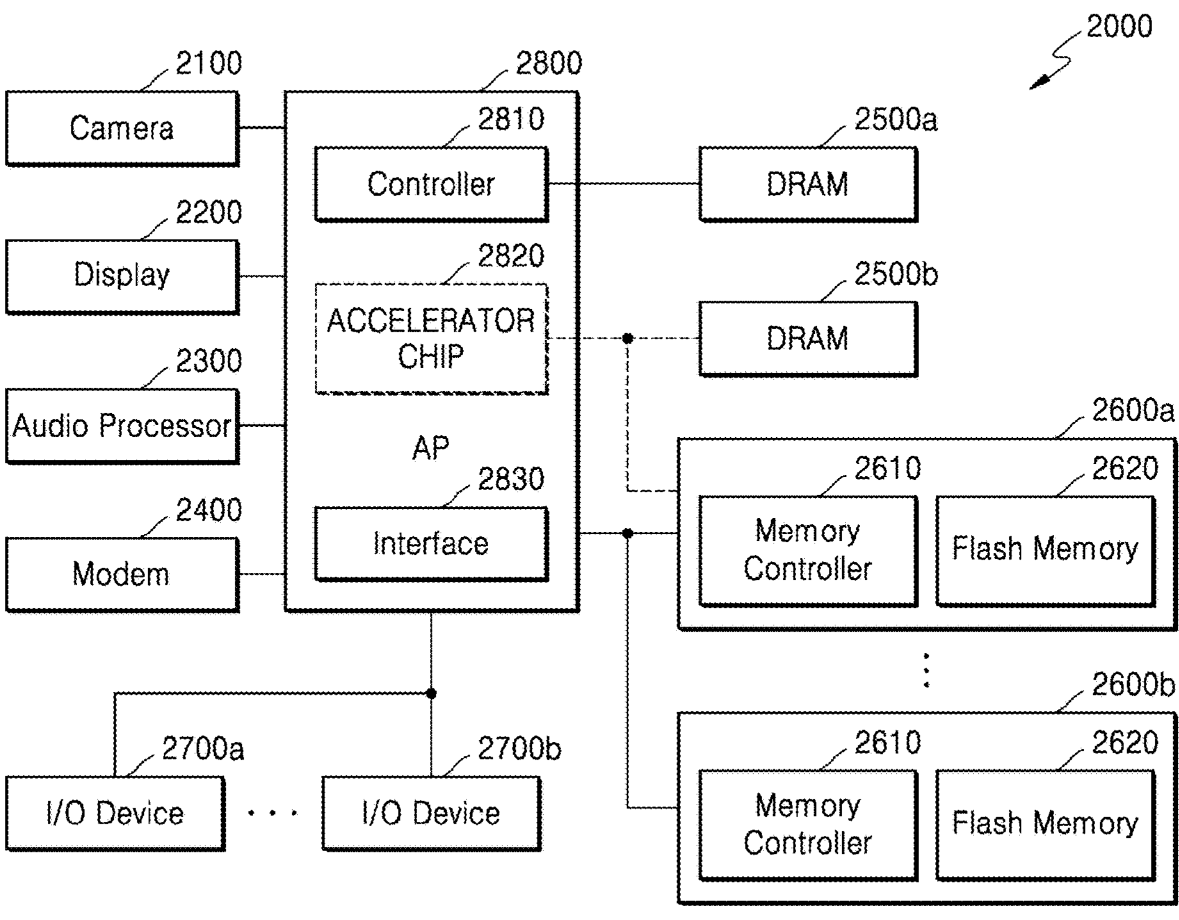
FIG. 15 is a block diagram of a system illustrating an electronic apparatus including a memory apparatus, according to embodiments.

FIG. 15 is a block diagram of a system 2000 illustrating an electronic apparatus including a memory apparatus, according to embodiments.

Referring to FIG. 15, the system 2000 may include a camera 2100, a display 2200, an audio processor 2300, a modem 2400, dynamic random access memories (DRAMs) 2500*a* and 2500*b*, flash memory devices 2600*a* and 2600*b*, input/output (I/O) devices 2700*a* and 2700*b*, and an application processor (AP) 2800. The system 2000 may include, for example, a laptop computer, a mobile phone, a smartphone, a tablet PC, a wearable device, a healthcare device, or an Internet of things (IoT) device. The system 2000 may include a server or a PC.

The camera 2100 may shoot a still image or a video under a user's control and store image/video data or transmit the image/video data to the display 2200. The audio processor 2300 may process audio data included in the contents of the flash memory devices 2600*a* and 2600*b* or a network. For wired/wireless data communication, the modem 2400 modulates a signal, transmits a modulated signal, and demodulates a received signal to restore an original signal. The I/O devices 2700*a* and 2700*b* may include devices, such as universal serial bus (USB) storage, a digital camera, a secure digital (SD) card, a digital versatile disc (DVD), a network adapter, and a touch screen, which provide digital input and/or output functions.

The AP 2800 generally controls operations of the system 2000. The AP 2800 may include a controller 2810, an accelerator block or accelerator chip 2820, and an interface 2830. The AP 2800 may control the display 2200 to display some of the contents stored in the flash memory devices 2600*a* and 2600*b*. When the AP 2800 receives user input through the I/O devices 2700*a* and 2700*b*, the AP 2800 may perform a control operation corresponding to the user input. The AP 2800 may include an accelerator block, which is a dedicated circuit for artificial intelligence (AI) data operations, or the accelerator chip 2820 may be provided separately from the AP 2800. The DRAM 2500*b* may be additionally mounted on the accelerator block or the accelerator chip 2820. An accelerator is a functional block that specially performs a certain function of the AP 2800 and may include a GPU that is a functional block specially performing graphics data processing, a neural processing unit (NPU) that is a functional block specially performing AI calculation and inference, and a data processing unit (DPU) that is a functional block specially performing data transmission. In an embodiment, an image shot by a user through the camera 2100 may undergo signal processing and may be stored in the DRAM 2500*b*, and the accelerator block or the accelerator chip 2820 may perform an AI data operation using data stored in the DRAM 2500*b* and a function used for inference to recognize the data.

The system 2000 may include a plurality of DRAMs 2500*a* and 2500*b*. The AP 2800 may control the DRAMs 2500*a* and 2500*b* through commands and mode register setting (MRS), which comply with Joint Electron Device Engineering Council (JEDEC) standards, or may set a DRAM interface protocol and communicate with the DRAMs 2500*a* and 2500*b* to use company's unique functions, such as low voltage, high speed, reliability, and a cyclic redundancy check (CRC) function, and/or an error correction code (ECC) function. For example, the AP 2800 may communicate with the DRAM 2500*a* through an interface, such as low power double data rate 4 (LPDDR4) or LPDDR5, complying with the Joint Electron Device Engineering Council (JEDEC) standards, and the accelerator block or the accelerator chip 2820 may set a new DRAM interface protocol and communicate with the DRAM 2500*b* to control the DRAM 2500*b*, which has a higher bandwidth than the DRAM 2500*a* for an accelerator.

Although only the DRAMs 2500*a* and 2500*b* are illustrated in FIG. 15, embodiments are not limited thereto. Any type of memory, such as phase-change RAM (PRAM), static RAM (SRAM), magnetic RAM (MRAM), resistance RAM (RRAM), ferroelectric RAM (FRAM), or hybrid RAM, which satisfies the requirements of a bandwidth, a response speed, and/or a voltage for the AP 2800 or the accelerator chip 2820, may be used. The DRAMs 2500*a* and 2500*b* have relatively less latency and bandwidth than the I/O devices 2700*a* and 2700*b* or the flash memory devices 2600*a* and 2600*b*. The DRAMs 2500*a* and 2500*b* may be initialized when the system 2000 is powered on and may be loaded with an operating system (OS) and application data to be used as a temporary storage of the OS and the application data or may be used as a space for execution of various kinds of software code.

The four fundamental arithmetic operations, i.e., addition, subtraction, multiplication, and division, vector operations, address operation, or fast Fourier transform (FFT) operations may be performed in the DRAMs 2500*a* and 2500*b*. Functions for executions used for inference may also be performed in the DRAMs 2500*a* and 2500*b*. Here, the inference may be performed during a deep learning algorithm using an artificial neural network. The deep learning algorithm may include a training phase, in which a model is trained using various data, and an inference phase, in which data is recognized using the trained model.

The system 2000 may include a plurality of storages or flash memory devices 2600*a* and 2600*b*, which have a larger capacity than the DRAMs 2500*a* and 2500*b*. The accelerator block or the accelerator chip 2820 may perform a training phase and an AI data operation using the flash memory devices 2600*a* and 2600*b*. In an embodiment, each of the flash memory devices 2600*a* and 2600*b* may include a memory controller 2610 and a flash memory 2620 and may allow the AP 2800 and/or the accelerator chip 2820 to efficiently perform a training phase and an inference AI data operation using an arithmetic unit included in a memory controller 2610. The flash memory devices 2600*a* and 2600*b* may store images shot through the camera 2100 or data received from a data network. For example, the flash memory devices 2600*a* and 2600*b* may store augmented and/or virtual reality contents, high definition (HD) contents, or ultra-high definition (UHD) contents.

The elements of the system 2000 may include semiconductor apparatuses and/or memory apparatuses, which are described with reference to FIGS. 1 to 10. The semiconductor apparatus and/or the memory apparatuses may include a receiver that receives a data symbol having multiple voltage levels through a data line. The receiver may include partial DFE circuitry, slider circuitry, a decoder, and a control circuit. The data symbol may be modulated according to PAM and encoded according to MTA coding that prevents an MT event from occurring between symbols. The multiple voltage levels may include the highest level and the lowest level. The partial DFE circuitry may selectively equalize the data symbol based on a previous data symbol value. The slider circuitry may compare the equalized data symbol with multiple reference voltage levels by using multiple comparator circuits and may provide multiple decision values as a result of the comparison. The decoder may decode the data symbol based on the multiple decision values. The control circuit may store the multiple decision values as a previous data symbol value. The control circuit may disable a comparator circuit, which decides the highest level among the multiple comparator circuits, when the previous data symbol value is related to (e.g., corresponds to) the lowest level and may disable a comparator circuit, which decides the lowest level among the multiple comparator circuits, when the previous data symbol value is related to (e.g., corresponds to) the highest level. The receiver of the inventive concept may reduce power consumption through a comparator circuit that is selectively disabled according to the previous data symbol value among the multiple comparator circuits of the slicer circuitry. In addition, due to DFE circuits that are selectively activated as the switches of the partial DFE circuitry are selectively turned on or off according to the previous data symbol value, power consumption may also be reduced and a data eye may be enlarged. The improved functionality of the receiver may be useful for high-performance electronic apparatus and systems.

While the inventive concept has been particularly shown and described with reference to embodiments thereof, it will be understood that various changes in form and details may be made therein without departing from the spirit and scope of the following claims.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first") in a particular claim may be described elsewhere with a different ordinal number (e.g., "second") in the specification or another claim.

What is claimed is:

1. A receiver comprising:

a data line configured to receive a data symbol having multiple voltage levels, the data symbol being modulated according to pulse-amplitude modulation (PAM) and encoded according to maximum transition avoidance (MTA) coding that prevents a maximum transition (MT) event from occurring between symbols, and the multiple voltage levels including a highest level and a lowest level;

a comparator circuit connected to the data line and including multiple comparators configured to compare the data symbol with multiple reference voltage levels, respectively, in response to multiple clock signals, respectively, the comparator circuit being configured to output multiple decision values as a result of the comparison;

a decoder configured to decode the data symbol, based on the multiple decision values; and a control circuit connected to the comparator circuit and configured to store the multiple decision values as a previous data symbol value and, based on the previous data symbol value, selectively provide the multiple clock signals to the comparator circuit, wherein the control circuit is further configured to, when the previous data symbol value corresponds to the lowest level, disable a first comparator configured to decide the highest level, from among the multiple comparators.

2. The receiver of claim 1, wherein:

the control circuit is further configured to, when the previous data symbol value corresponds to the highest level, disable a second comparator configured to decide the lowest level, from among the multiple comparators.

3. The receiver of claim 2, wherein the comparator circuit includes:

the first comparator configured to compare a voltage level of the data symbol with a highest reference voltage level among the multiple reference voltage levels and output a first decision value;

the second comparator configured to compare the voltage level of the data symbol with a lowest reference voltage level among the multiple reference voltage levels and output a third decision value; and a third comparator configured to compare the voltage level of the data symbol with a middle reference voltage level among the multiple reference voltage levels and output a second decision value, the middle reference voltage level being set to a voltage level between the highest reference voltage level and the lowest reference voltage level.

4. The receiver of claim 3, wherein:

the previous data symbol value is composed of the first to third decision values related to the data symbol that is most recently previously received through the data line.

5. The receiver of claim 1, further comprising:

a decision feedback equalization (DFE) circuit configured to equalize the data symbol of the data line, based on the previous data symbol value.

6. A receiver comprising:

a data line configured to receive a data symbol having multiple voltage levels, the data symbol being modulated according to pulse-amplitude modulation (PAM) and encoded according to maximum transition avoidance (MTA) coding that prevents a maximum transition (MT) event from occurring between symbols;

a partial decision feedback equalization (DFE) circuit including switches connected to the data line, the partial DFE circuit being configured to selectively equalize the data symbol, based on a previous data symbol value;

a slicer circuit connected to the data line and configured to determine a voltage level of the selectively equalized data symbol;

a decoder configured to decode the data symbol, based on multiple decision values of the slicer circuit; and a control circuit configured to store the multiple decision values as the previous data symbol value and provide the previous data symbol value to the partial DFE circuit, wherein the control circuit is further configured to selectively turn on or off the switches of the partial DFE circuit according to the previous data symbol value.

7. The receiver of claim 6, wherein:

the slicer circuit includes multiple comparator circuits configured to compare the selectively equalized data symbol with multiple reference voltage levels, respectively, in response to multiple clock signals, respectively, and is configured to output the multiple decision values as a result of the comparison.

8. The receiver of claim 7, wherein:

the partial DFE circuit further includes DFE circuits associated with comparator circuits among the multiple comparator circuits.

9. The receiver of claim 7, wherein the multiple comparator circuits of the slicer circuit include:

a first comparator circuit configured to compare the voltage level of the selectively equalized data symbol with a highest reference voltage level among the multiple reference voltage levels and output a first decision value;

a second comparator circuit configured to compare the voltage level of the selectively equalized data symbol with a middle reference voltage level among the multiple reference voltage levels and output a second decision value; and a third comparator circuit configured to compare the voltage level of the selectively equalized data symbol with a lowest reference voltage level among the multiple reference voltage levels and output a third decision value, wherein the middle reference voltage level is set to a voltage level between the highest reference voltage level and the lowest reference voltage level.

10. The receiver of claim 9, wherein:

the previous data symbol value is composed of the first to third decision values related to the data symbol that is most recently previously received through the data line.

11. The receiver of claim 9, wherein the partial DFE circuit further includes:

a first DFE circuit including a first switch and a first adder connected to the data line, the first switch selectively connecting the first DFE circuit to the data line in response to an inverted value of the second decision value;

a second DFE circuit including first and second switches and a second adder connected to the data line, the second switch selectively connecting the second DFE circuit to the data line in response to an inverted value of the first decision value, and the third switch selectively connecting the second DFE circuit to the data line in response to the third decision value; and a third DFE circuit including a third switch and a third adder connected to the data line, the third switch selectively connecting the third DFE circuit to the data line in response to the first decision value.

12. The receiver of claim 11, wherein:

the first switch is configured to adjust the data symbol received through the data line by providing a first weight value to the first adder, the second switch and the third switch are configured to adjust the data symbol received through the data line by respectively providing a second weight value and a third weight value to the second adder, and the third switch is configured to adjust the data symbol received through the data line by providing a fourth weight value to the third adder.

13. The receiver of claim 12, wherein:

the first weight value, the second weight value, the third weight value, and the fourth weight value are set to the same weight value.

14. The receiver of claim 12, wherein:

the first weight value, the second weight value, the third weight value, and the fourth weight value are set to different weight values from each other.

15. A method comprising:

receiving a data symbol having multiple voltage levels through a data line, the data symbol being modulated according to pulse-amplitude modulation (PAM) and encoded according to maximum transition avoidance (MTA) coding that prevents a maximum transition (MT) event from occurring between symbols, and the multiple voltage levels including a highest level and a lowest level;

selectively equalizing the data symbol, based on a previous data symbol value, by using a partial decision feedback equalization (DFE) circuit;

comparing the equalized data symbol with middle reference voltage levels by using multiple comparator circuits;

providing multiple decision values as a result of the comparison;

decoding the data symbol, based on the multiple decision values;

storing the multiple decision values as the previous data symbol value; and, when the previous data symbol value corresponds to the lowest level, disabling a comparator circuit that decides the highest level, from among the multiple comparator circuits.

16. The method of claim 15, further comprising:

when the previous data symbol value corresponds to the highest level, disabling a comparator circuit that decides the lowest level, from among the multiple comparator circuits.

17. The method of claim 16, wherein the selective equalizing of the data symbol, based on the previous data symbol value, includes:

selectively turning on or off switches of the partial DFE circuit according to the previous data symbol value; and connecting a DFE circuit to the data line, the DFE circuit being connected to at least one on-switch among DFE circuits of the partial DFE circuit, the DFE circuits being associated with comparator circuits among the multiple comparator circuits.

18. The method of claim 17, further comprising:

adjusting the data symbol according to a weight value of the DFE circuit connected to the data line.

19. The method of claim 17, wherein the DFE circuits of the partial DFE circuit have different weight values from each other.

20. The method of claim 15, wherein:

the previous data symbol value corresponds to the data symbol that is most recently received through the data line.

* * * * *